US010266687B2

(12) United States Patent
Van Rheenen et al.

(10) Patent No.: US 10,266,687 B2
(45) Date of Patent: Apr. 23, 2019

(54) POLYMER COMPOSITION, CAPSTOCK COMPRISING THE SAME AND A PROCESS TO MAKE SUCH CAPSTOCK

(71) Applicant: Rohm and Haas Company, Philadelphia, PA (US)

(72) Inventors: Paul R. Van Rheenen, Warminster, PA (US); Scott W. Reading, Burlington, NJ (US)

(73) Assignee: Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/310,682

(22) PCT Filed: Apr. 28, 2015

(86) PCT No.: PCT/US2015/027936
§ 371 (c)(1),
(2) Date: Nov. 11, 2016

(87) PCT Pub. No.: WO2015/175206
PCT Pub. Date: Nov. 19, 2015

(65) Prior Publication Data
US 2017/0081510 A1 Mar. 23, 2017

Related U.S. Application Data

(60) Provisional application No. 61/992,493, filed on May 13, 2014.

(51) Int. Cl.
*C08L 27/06* (2006.01)
*C08J 3/22* (2006.01)
*C08L 91/06* (2006.01)
*C08K 5/09* (2006.01)
*C08K 5/00* (2006.01)
*C08L 51/00* (2006.01)

(52) U.S. Cl.
CPC .............. *C08L 27/06* (2013.01); *C08J 3/22* (2013.01); *C08K 5/0008* (2013.01); *C08K 5/09* (2013.01); *C08L 51/003* (2013.01); *C08L 91/06* (2013.01); *C08L 2205/03* (2013.01); *C08L 2205/035* (2013.01); *C08L 2207/53* (2013.01)

(58) Field of Classification Search
CPC ........ C08L 27/06; C08L 91/06; C08L 51/003; C08J 3/22; C08K 5/0008; C08K 5/09
See application file for complete search history.

(56) References Cited

U.S. PATENT DOCUMENTS

| | | |
|---|---|---|
| 3,793,402 A | 2/1974 | Owens |
| 3,971,835 A | 7/1976 | Myers et al. |
| 4,427,836 A | 1/1984 | Kowalski et al. |
| 4,468,498 A | 8/1984 | Kowalski et al. |
| 4,469,825 A | 9/1984 | Kowalski et al. |
| 4,594,363 A | 6/1986 | Blankenship et al. |
| 4,677,003 A | 6/1987 | Redlich et al. |
| 4,910,229 A | 3/1990 | Okubo |
| 4,920,160 A | 4/1990 | Chip et al. |
| 4,920,241 A | 11/1990 | Kowalski et al. |
| 5,157,084 A | 10/1992 | Lee et al. |
| 5,494,971 A | 2/1996 | Blankenship et al. |
| 5,510,422 A | 4/1996 | Blankenship et al. |
| 5,534,594 A | 7/1996 | Troy et al. |
| 5,599,854 A | 2/1997 | Troy et al. |
| 6,139,961 A | 10/2000 | Blankenship et al. |
| 6,534,592 B1 | 3/2003 | Chou et al. |
| 6,632,531 B2 | 10/2003 | Blankenship |
| 6,896,905 B2 | 5/2005 | Blankenship et al. |
| 2003/0008959 A1 | 1/2003 | Crabb et al. |
| 2005/0003221 A1* | 1/2005 | Walrath ............. B29C 47/0019 428/522 |
| 2006/0058460 A1 | 3/2006 | VanRheenen |

FOREIGN PATENT DOCUMENTS

| | | |
|---|---|---|
| EP | 267726 | 5/1988 |
| EP | 331421 | 9/1989 |
| EP | 0473379 | 3/1992 |
| EP | 915108 | 5/1999 |
| EP | 1086988 | 3/2001 |
| WO | WO2007/050230 | 5/2007 |

OTHER PUBLICATIONS

Honeywell: Specialty Additives Vivek Ranjan Lubricants for PVC Vinylplast 2013 (Year: 2013).*
EP Response Office Action received Jun. 21, 2017; from EP counterpart Application No. 15 721 489.1.
PCT Search Report dated Jun. 30, 2015; from PCT counterpart Application No. PCT/US2015/027936.
PCT IPRP Report dated Nov. 15, 2016; from PCT counterpart Application No. PCT/US2015/027936.
EP Office Action dated Jan. 13, 2016; from counterpart EP Application No. 15721489.1.
"Honeywell A-C Performance Additives for Paints Coatings and Inks—Typical Properites," printed from https://www.honeywell-additives.com/Additives/Literature/Honeywell-A-C-performance-additives-paints-coatings-in-properties-chart.pdf. (Jun. 23, 2015), pp. 1-2.
Chinese Office Action dated Feb. 13, 2018; from Chinese counterpart Application No. 201580021577.3.

(Continued)

*Primary Examiner* — Peter D. Mulcahy

(57) ABSTRACT

A base resin including from 30 to 70 percent by weight impact modified acrylic resin having a Tg from 60 to 150° C.; from 70 to 30 percent by weight polyvinylchloride (PVC), wherein the weight percentages of the impact modified acrylic resin and the polyvinylchloride are based on the combined weight of the impact modified acrylic resin and the polyvinylchloride; from 0.25 to 4 weight percent of anti-melding additive based on the total base resin weight; and from 0.5 weight percent to 25 weight percent colorant based on total base resin weight is provided. Also provided are capstock compositions including one or more base resins, a process for making a capstock, and capstock produced thereby.

7 Claims, No Drawings

(56) References Cited

OTHER PUBLICATIONS

Chinese Office Action dated Sep. 27, 2018; from Chinese counterpart Application No. 201580021577.3.
EP Office Action received Dec. 11, 2018; from EP counterpart Application No. 15721489.1.

* cited by examiner

POLYMER COMPOSITION, CAPSTOCK COMPRISING THE SAME AND A PROCESS TO MAKE SUCH CAPSTOCK

FIELD OF INVENTION

The instant disclosure relates to a polymer composition, capstock comprising the same and a process to make such capstock.

BACKGROUND OF THE INVENTION

In making siding, fencing, deck boards, and other extruded articles, manufacturers sometimes desire a multicolored final product, referred to as an accented, variegated, or streaked color. In some instances, the multicolored effect is accomplished by using a thin, coextruded layer, called a capstock, over a plastic substrate.

Using state of the art resins, when different colored pellets of the same base formulation are mixed together and then extruded, the colors mix in the extruder when the pellets melt to give a uniform colored article out of the extruder die.

Current methods for obtaining the multicolored effect, and to avoid the color melding, is to use a base resin with one softening point mixed with colored pellets of a higher softening point resin. During extrusion the base resin melts first and the zones of the extruder are adjusted in temperature such that the higher softening point resin melts toward the end of the extruder near the die and never completely melts into the base resin. The higher temperature softening point resin, e.g. polycarbonate (PC) and α-methyl styrene, however, generally does not have weathering properties as good as the base resin such that the streaked accent colors fade and chalk faster than the base color.

It would be desirable to have a formulation which does not result in such color melding upon extrusion.

SUMMARY OF THE INVENTION

The instant disclosure is for a polymer composition, capstock comprising the same and a process to make such capstock.

The instant disclosure provides a polymer composition comprising a base resin which comprises from 30 to 70 weight percent (meth)acrylic resin having a Tg from 60 to 150° C.; from 70 to 30 weight percent polyvinylchloride (PVC); from 0.25 to 4 weight percent of anti-melding additive based on the total polymer composition weight; and from 0.5 to 25 weight percent colorant based on total polymer composition weight.

The instant disclosure further provides a capstock comprising the polymer composition and a process for producing a capstock.

DETAILED DESCRIPTION OF THE INVENTION

As used herein, the term "(meth)acrylic resin" includes acrylic resins, methacrylic resins or combinations thereof.

In one embodiment, the instant disclosure is a polymer composition comprising a base resin which comprises from 30 to 70 weight percent (meth)acrylic resin having a Tg from 60 to 150° C.; from 70 to 30 weight percent polyvinylchloride (PVC); from 0.25 to 4 weight percent of anti-melding additive based on the total polymer composition weight; and from 0.5 to 25 weight percent colorant based on total polymer composition weight.

The base resin comprises from 30 to 70 weight percent (wt %) (meth)acrylic resin. All individual values and subranges from 30 to 70 wt % are included and disclosed herein; for example, the amount of (meth)acrylic resin can be from a lower limit of 30, 40, 50 or 60 wt % to an upper limit of 35, 45, 55, 65 or 70 wt %. For example, the amount of (meth)acrylic resin can be from 30 to 70 wt %, or in the alternative, from 30 to 50 wt %, or in the alternative, from 45 to 70 wt %, or in the alternative, from 40 to 60 wt %. The weight percentages of the (meth)acrylic resin are based upon the total weight of the (meth)acrylic resin and the polyvinylchloride.

The (meth)acrylic resin has a glass transition temperature (Tg) from 60 to 150° C. All individual values and subranges from 60 to 150° C. are included and disclosed herein; for example, the Tg of the (meth)acrylic resin can be from a lower limit of 60, 80, 100, 120 or 140° C. to an upper limit of 70, 90, 110, 130 or 150° C. For example, the Tg of the (meth)acrylic resin can be from 60 to 150° C., or in the alternative, from 60 to 110° C., or in the alternative, from 100 to 150° C., or in the alternative, from 90 to 240° C.

In one embodiment the (meth)acrylic resin is an impact modified (meth)acrylic resin. Impact modified acrylic resin, as used herein, includes those resins comprising one or more acrylic or methacrylic polymers having a drop dart impact strength of greater than 10 in-lbs per 40 mils at 23° C., measured according to ASTM D4226. One example of a commercially available impact modified acrylic resin is ACRYLIGARD CS-134, which is an impact modified PMMA/acrylate copolymer, available from The Dow Chemical Company. Another exemplary impact modified (meth)acrylic resin includes acrylic-styrene-acrylonitrile resin (ASA), which is a two-phase thermoplastic material combining styrene-acrylonitrile copolymer and acrylic rubber.

In a particular embodiment, the impact modified (meth)acrylic resin comprises 25 to 90 wt % of a thermoplastic (meth)acrylic copolymer having a glass transition temperature (Tg) from 60 to 150° C. blended with 75 to 10 wt % of an impact modifier selected from the group consisting of (meth)acrylic impact modifiers. All individual values and subranges from 25 to 90 wt % of a thermoplastic (meth)acrylic copolymer are included and disclosed herein; for example, the amount of thermoplastic (meth)acrylic copolymer can be from a lower limit of 25, 35, 45, 55, 65, 70, 75, 80 or 85 wt % to an upper limit of 30, 40, 50, 60, 70, 75, 80, 85 or 90 wt %. For example, the amount of thermoplastic (meth)acrylic copolymer can be from 25 to 90 wt %, or in the alternative, from 50 to 90 wt %, or in the alternative, from 25 to 60 wt %, or in the alternative, from 37 to 67 wt %. All individual values and subranges of a Tg from 60 to 150° C. are included and disclosed herein; for example, the Tg can be from a lower limit of 60, 70, 80, 90, 100, 110, 120, 130, or 140° C. to an upper limit of 65, 75, 85, 95, 105, 115, 125, 135, 145 or 150° C. For example, the Tg can be from 60 to 150° C., or in the alternative, from 60 to 150° C., or in the alternative, from 90 to 150° C., or in the alternative, from 60 to 100° C., or in the alternative, from 80 to 120° C. Thermoplastic (meth)acrylic copolymers comprise one or more monomers selected from the group consisting of $C_1$-$C_{18}$ (meth)acrylate monomer units and combinations thereof, including, by way of example and not limitation, butyl acrylate, ethyl acrylate, 2-ethyl hexyl acrylate, propyl acrylate, methyl acrylate, hexyl acrylate, butylmethacrylate, methylmethacrylate, ethylhexyl methacrylate, stearyl acrylate, benzyl acrylate, styrene, acrylonitrile blends thereof, and combinations thereof. In such embodiments, the thermoplastic (meth)acrylic copolymer having a glass transition temperature (Tg) from 60 to 150° C. is blended with 75 to 10 wt % of an impact modifier selected from the group consisting of (meth)acrylic impact modifiers. All individual values and subranges from 75 to 10 wt % impact modifier are included herein and disclosed herein; for example, the amount of impact modifier can be from a lower limit of 10, 15, 25, 35, 45, 55, 65 or 70 wt % to an upper limit of 20, 30, 40, 50, 60, 70 or 75 wt %. For example, the amount of impact modifier can be from 10 to 75 wt %, or in the alternative, from 50 to 75 wt %, or in the alternative, from 10 to 50 wt %, or in the alternative, from 30 to 60 wt %. The impact modifier is selected from the group consisting of (meth)acrylic impact modifiers. Exemplary acrylic impact modifiers include PARALOID KM-334, commercially available from The Dow Chemical Company.

In a particular embodiment, the (meth)acrylic resin comprises one or more core/shell polymers which comprise a crosslinked core comprising between 0.1 and 4 PHM crosslinking monomer and/or graft-linking agent and one or more (meth)acrylate copolymers having a glass transition temperature of less than or equal to −20° C.; and one or more, optionally crosslinked, thermoplastic shells having a Tg of equal to or greater than 60° C. wherein the total amount of the one or more shells comprises 5 to 90 wt % of the total weight of the one or more core/shell polymers.

Core/shell polymer structures and methods for making such structures (generally, aqueous multistage emulsion polymerization) are disclosed, for example, in U.S. Pat. Nos. 4,427,836; 4,468,498; 4,469,825; 4,594,363; 4,677,003; 4,910,229; 4,920,160; 4,970,241; 5,157,084; 5,494,971; 5,510,422; 6,139,961; 6,632,531; and 6,896,905; as well as in European Patent Applications EP 267,726, EP 331,421 and EP 915,108, the disclosures of which are incorporated herein by reference. The term "multistage emulsion polymerization" used herein is intended to encompass its broadest possible meaning, including the meaning conveyed in prior art such as U.S. Pat. Nos. 3,793,402, 3,971,835, 5,534,594, and 5,599,854, which offer various means for achieving "staged" polymers.

When present in the (meth)acrylic resin, the core/shell polymers comprise a crosslinked core which comprises between 0.1 and 4 parts by weight per hundred parts by weight of the total weight of the (meth)acrylate copolymer (PHM) of units derived from one or more crosslinking monomers and/or graft-linking agents. All individual values and subranges from 0.1 to 4 PHM are included and disclosed herein; for example, the amount of units derived from the one or more crosslinking monomers and/or graft-linking agents can be from a lower limit of 0.1, 0.5, 1, 2, or 3 PHM to an upper limit of 0.5, 0.75, 1.5, 2.5, 3.5 or 4 PHM. For example, the amount of the crosslinking monomer and/or graft-linking agent in the crosslinked core can be from 0.1 to 4 PHM, or in the alternative, from 2 to 4 PHM, or in the alternative, from 0.1 to 2.75 PHM, or in the alternative, from 1 to 3 PHM.

A crosslinking monomer useful in the impact modified acrylic resins is a monomer that has two or more reactive groups that are capable of participating in a polymerization reaction. Exemplary crosslinking monomers include, but not limited to divinylbenzene, trimethyolpropane triacrylate, ethylene glycol dimethacrylate (EGDMA), butylene glycol dimethacrylate (BGDMA), trimethyolpropane trimethacrylate, allyl methacrylate, blends thereof, and combinations thereof. Additional useful crosslinking monomer may be selected from the group consisting of divinylbenzene; allyl compounds including diallyl phthalate, diallylacrylamide, triallyl (iso)cyanurate, and triallyl trimelitate; (poly)alkylene glycol di(meth)acrylate compounds including 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, and dipentaerythritol penta(meth)acrylate.

Graft-linking agents useful in the (meth)acrylic resins are polyethylenically unsaturated monomers copolymerizable with the (meth)acrylic copolymers, and having two or more non-conjugated double bonds of differing reactivity, as for example allyl methacrylate, diallyl maleate and allyl acryloxypropionate. One preferred graft-linking agent is allyl methacrylate. In those embodiments in which the (meth)acrylic resin comprises one or more core/shell polymers, the crosslinked core comprises one or more (meth)acrylate copolymers having a glass transition temperature of less than or equal to −20° C. In a particular embodiment, the one or more (meth)acrylate copolymers may be selected from the group consisting of copolymers which comprise units derived from one or more monomers selected from the group consisting of $C_1$-$C_{18}$ (meth)acrylate monomer units and combinations thereof. As used herein, the term "(meth) acrylate" refers to acrylate, methacrylate or combinations thereof. In a particular embodiment, the (meth)acrylate copolymer of the crosslinked core is butyl acrylate.

All individual values and subranges of a glass transition temperature (Tg) of the one or more (meth)acrylate copolymers of less than or equal to −20° C. are included and disclosed herein. For example, the glass transition temperature of the one or more (meth)acrylate copolymers may be less than or equal to −20° C., or in the alternative, less than or equal to −25° C., or in the alternative, less than or equal to −30° C., or in the alternative, less than or equal to −35° C. In a particular embodiment, the Tg is greater than or equal to −70° C. All individual values and subranges from greater than or equal to −70° C. are included and disclosed herein; for example, the Tg can be greater than or equal to −70° C., or in the alternative, greater than or equal to −60° C., or in the alternative, greater than or equal to −50° C., or in the alternative, greater than or equal to −40° C.

When present in the impact modified acrylic resin, the core/shell polymers comprise one or more, optionally crosslinked, thermoplastic shells having a Tg of equal to or greater than 60° C. wherein the total amount of the one or more shells comprises 5 to 90 wt % of the total weight of the one or more core/shell polymers. All individual values and subranges of a Tg equal to or greater than 60° C. are included and disclosed herein. For example, the Tg of the thermoplastic shell can be equal to or greater than 65° C., or in the alternative, equal to or greater than 70° C., or in the alternative, equal to or greater than 75° C., or in the alternative, equal to or greater than 80° C. In one particular embodiment, the Tg is less than or equal to 150° C. All individual values and subranges from less than or equal to 150° C. are included and disclosed herein; for example, the Tg can be less than or equal to 150° C., or in the alternative, less than or equal to 140° C., or in the alternative, less than or equal to 130° C., or in the alternative, less than or equal to 120° C., or in the alternative, less than or equal to 100° C. The total amount of one or more shells in the core/shell polymer is from 5 to 90 wt %. All individual values and subranges from 5 to 90 wt % are included and disclosed herein; for example, the total amount of the one or more shells can be from a lower limit of 5, 15, 25, 35, 45, 55, 65, 75 or 85 wt % to an upper limit of 10, 20, 30, 40, 50, 60, 70, 75, 80, 85 or 90 wt %. For example, the total amount of the one or more shells in the core/shell polymer can be from 5 to 90 wt %, or in the alternative, from 5 to 45 wt %, or in the alternative, from 35 to 90 wt %, or in the alternative, from 25 to 75 wt %, or in the alternative, from 35 to 55 wt %.

The one or more thermoplastic shells comprise one or more thermoplastic polymers. Exemplary thermoplastic polymers useful in the shell include, but are not limited to, polymethylmethacrylate (PMMA), Styrene-Acrylonitrile (SAN), polyacrylates, polyvinyl chloride, polymethacrylate, blends thereof, and combinations thereof. In some embodiments, the one or more thermoplastic shells are comprised predominantly of methyl methacrylate (MMA) monomer units. As used herein throughout the term "predominantly" means greater than 55 and less than 100 percent by weight, based on the total weight of the thermoplastic shell. All individual ranges and subranges between greater than 55 and less than 100 percent by weight are included herein and disclosed herein; for example, the one or more thermoplastic shells may have an MMA content by weight of greater than a lower limit of 55, 70, 80, or 90 percent and an upper limit of 99, 90, 85, or 75 percent. For example the thermoplastic shells may comprise units derived from MMA in the range of 55 to 99; or in the alternative, from 70 to 85; or in the alternative, from 80 to less than 100 percent by weight, based on the total weight of the thermoplastic shell. The one or more thermoplastic shells may comprise one or more (meth)acrylate copolymers, one or more (meth)acrylate/styrenic copolymers, one or more styrenic copolymers, or combinations thereof.

In a particular embodiment, the core/shell polymer has a rubbery (meth)acrylic core and thermoplastic shell grafted thereon, as described in U.S. Pat. No. 6,534,592, the disclosure of which is incorporated herein by reference.

The base resin comprises from 30 to 70 percent by weight polyvinylchloride (PVC). All individual values and subranges from 30 to 70 wt % are included and disclosed herein; for example, the amount of PVC can be from a lower limit of 30, 40, 50 or 60 wt % to an upper limit of 35, 45, 55, 65, or 70 wt %. For example, the amount of PVC can be from 30 to 70 wt %, or in the alternative, from 30 to 50 wt %, or in the alternative, from 45 to 70 wt %, or in the alternative, from 40 to 60 wt %. The weight percentages of the PVC are based upon the total weight of the impact modified acrylic resin and the polyvinylchloride.

The polymer composition comprises from 0.25 to 4 weight percent (wt %) of anti-melding additive based on the total polymer composition weight. As used herein, anti-melding additives are those additives which delay the melding of the resin pellets. All individual values and subranges from 0.25 to 4 wt % are included and disclosed herein; for example, the amount of anti-melding additive can be from a lower limit of 0.25, 0.35, 0.5, 1, 2, or 3 wt % to an upper limit of 0.3, 0.5, 0.75, 1.5, 2.5, 3.5 or 4 wt %. For example, the amount of anti-melding agent in the base resin can be from 0.25 to 4 wt %, or in the alternative, from 1.5 to 4 wt %, or in the alternative, from 0.25 to 2.5 wt %, or in the alternative, from 1.5 to 3 wt %, or in the alternative, from 0.5 to 1.5 wt %.

Anti-melding additives include waxes based on low density polyethylene. The polyethylene waxes can be homopolymers, oxidized homopolymers, or copolymers with acrylic acid, methacrylic acid, ethyl acrylate, butyl acrylate, vinyl acetate, maleic anhydride, or combinations thereof. Anti-melding additives can, in some instances, be in a powdered form so as to be dispersed easily into the melt during processing. Particularly useful are micronized waxes because of their fine particle size, less than or equal to 1 micron in diameter volume average.

In a particular embodiment, the anti-melding additive is one or more polyethylene-based waxes having a density less than 0.97 g/cc and an acid number less than or equal to 40 mg KOH/g. All individual values and subranges of a density less than 0.97 g/cc are included and disclosed herein; for example, the one or more polyethylene-based waxes can have a density less than 0.97, 0.965, 0.96, or 0.95 g/cc. In particular embodiments, the density is equal to or greater than 0.91, or 0.92, or 0.93 or 0.95 g/cc. All individual values and subranges of an acid number less than or equal to 40 mg KOH/g are included and disclosed herein; for example, the acid number can be less than or equal to 40, 32, 24, 16, 8, or 5 mg KOH/g. In particular embodiments, the acid number is equal to or greater than 0, or 4, or 7 or 10, or 17, or 25 or 34 mg KOH/g.

The polymer composition comprises from 0.5 weight percent to 25 weight percent colorant based on total polymer composition weight. All individual values and subranges from 0.5 to 25 wt % are included and disclosed herein; for example, the amount of colorant in the base resin can be from a lower limit of 0.5, 5, 10, 15 or 20 wt % to an upper limit of 1, 7.5, 12.5, 17.5, 22.5 or 25 wt %. For example, the amount of colorant in the base resin can be from 0.5 to 25 wt %, or in the alternative, from 0.5 to 12.5 wt %, or in the alternative, from 10 to 25 wt %, or in the alternative, from 7.5 to 20 wt %.

In another embodiment, the present disclosure provides a capstock composition comprising two or more polymer compositions according to any embodiment disclosed herein.

In another embodiment, the present disclosure provides a process for making a capstock having comprising: selecting two or more polymer compositions according to any embodiment disclosed herein; extruding the polymer composition into pellets; and extruding the pellets to form a capstock. In a particular embodiment, an extruder with minimal mixing elements, such as a simple, single screw extruder, is used in the final extruding step.

In another embodiment, the present disclosure provides a process for making a capstock having more than one color comprising: selecting two or more polymer compositions according to any embodiment disclosed herein, wherein the polymer compositions do not comprise the same amount or type of colorant; extruding the polymer compositions into pellets; mixing two or more differently colored polymer composition pellets and extruding them to form a streaked capstock. In a particular embodiment, an extruder with minimal mixing elements, such as a simple, single screw extruder, is used in the final extruding step.

In yet another embodiment, the present disclosure provides a capstock produced according to any embodiment of the process disclosed herein.

The present invention may be embodied in other forms without departing from the spirit and the essential attributes thereof, and, accordingly, reference should be made to the appended claims, rather than to the foregoing specification, as indicating the scope of the invention.

EXAMPLES

The Base Formulation used in the examples is shown in Table 1. The ingredients were blended on a high intensity HENSCHEL mixer.

TABLE 1

| Material | Weight Percentage |
|---|---|
| FORMOLON 614 (a PVC homopolymer resin which is commercially available from Formosa Plastics Corp. (Livingston, NJ)) | 46.94% |
| ADVASTAB TM-181 (a methyltin mercaptide stabilizer which is commercially available from The Dow Chemical Company (Midland, MI)) | 0.82% |
| Calcium Stearate | 0.40% |
| AMERILUBES XL165R (a paraffin wax which is commercially available from Amerilubes L.L.C. (Charlotte, NC)) | 0.30% |
| A-C 629A (an oxidized polyethylene wax-see Table 3) | 0.26% |
| ADVALUBE B-3310 (a balanced ester lubricant which is commercially available from the PMC Group | 0.37% |
| ADVALUBE F-1020 (a distearyl phthalate which is commercially available from The PMC Group) | 0.13% |
| TI-PURE R-960 (titanium dioxide which is commercially available from E. I. du Pont de Nemours and Company (Wilmington, DE)) | 0.94% |
| ACRYLIGARD CS-134 (an impact modified acrylic capstock resin which is commercially available from The Dow Chemical Company) | 48.75% |
| TINUVIN 123 (a hindered amine light stabilizer which is commercially available from BASF Corp. (Florham Park, NJ)) | 0.15% |
| TINUVIN 328 Benzotriazole (an ultraviolet absorber which is commercially available from BASF Corp.) | 0.70% |
| IRGAFOS 168 (an antioxidant which is commercially available from BASF Corp.) | 0.25% |

Table 2 provides the formulations for Samples 1A-17B, which were made by bag mixing the Base Formulation with additives and a black color concentrate, where added, in PVC resin supplied by Penn Color. Pellets were then made by using a HAAKE PolyLab QC counter rotating, twin screw extruder with zones set at: zone 1=130° C., zone 2=150° C., zone 3=175° C., and die=175° C. Screw rpm was 100. Pellets roughly ⅛ inch in diameter and length were made.

TABLE 2

| Example No. | Parts by wt Base Formulation | Parts by wt Additive | Parts by weight Black Color Concentrate | Streaking rating of A and B blend 1-10 (1 = uniform color) |
|---|---|---|---|---|
| 1A | 100 | 0 | 0 | — |
| 1B | 100 | 0 | 9 | 2 |
| 2A | 99.75 | 0.25 CERAFLOUR 961 | 0 | — |
| 2B | 99.75 | 0.25 CERAFLOUR 961 | 9 | 3 |
| 3A | 99.5 | 0.5 CERAFLOUR 961 | 0 | |
| 3B | 99.5 | 0.5 CERAFLOUR 961 | 9 | 5 |
| 4A | 99.25 | 0.75 CERAFLOUR 961 | 0 | |
| 4B | 99.25 | 0.75 CERAFLOUR 961 | 9 | 9 |
| 5A | 99 | 1 CERAFLOUR 961 | 0 | |
| 5B | 99 | 1 CERAFLOUR 961 | 9 | 9 |
| 6A | 99 | 1 ACUMIST 1528 | 0 | |
| 6B | 99 | 1 ACUMIST 1528 | 9 | 8 |
| 7A | 99 | 1 ADVALUBE E-2100 | 0 | |
| 7B | 99 | 1 ADVALUBE E-2100 | 9 | 6 |
| 8A | 99.5 | 0.5 ADVAWAX 280 | 0 | |
| 8B | 99.5 | 0.5 ADVAWAX 280 | 9 | 2 |
| 9A | 99 | 1 A-C 629A | 0 | |
| 9B | 99 | 1 A-C 629A | 9 | 7 |
| 10A | 99 | 1 A-C 307A | 0 | |
| 10B | 99 | 1 A-C 307A | 9 | 2 |
| 11A | 99 | 1 A-C 540 | 0 | |
| 11B | 99 | 1 A-C 540 | 9 | 4 |
| 12A | 99 | 1 A-C 573A | 0 | |
| 12B | 99 | 1 A-C 573A | 9 | 9 |
| 13A | 99 | 1 A-C 575A | 0 | |
| 13B | 99 | 1 A-C 575A | 9 | 7 |
| 14A | 99 | 1 W-165R | 0 | |
| 14B | 99 | 1 W-165R | 9 | 3 |
| 15A | 99 | 1 ACUMIST C5 | 0 | |
| 15B | 99 | 1 ACUMIST C5 | 9 | 9 |
| 16A | 99 | 1 A-C 400A | 0 | |
| 16B | 99 | 1 A-C 400A | 9 | 9 |
| 17A | 99 | 1 A-C 617A | 0 | |
| 17B | 99 | 1 A-C 617A | 9 | 9 |

Additives not previously described are described in Table 3.

To examine streaking, 91 parts of example part A and 9 parts of example part B pellets (for each sample set 1 through 17) were bag mixed and extruded on a C.W. BRABENDER INTELLITORQUE PLASTI-CORDER single screw extruder (Model 2503). The screw had a 25 L/D and a 1.5:1 screw compression ratio. Zones were set at: zone 1=50° C., zone 2=75° C., zone 3=160° C., and die=170° C. The rpm was set at 30. A 4 inch wide die was used with a 50 mil gap. Streaking was visually rated from 1 to 10 with 1 being uniform color with no color variation and 10 showing strong streaks of black against a white background. The streaking rating for each formulation system is shown in Table 2. The best streaking effects are provided by low density polyethylene materials with low acid numbers.

TABLE 3

| Additive | Description | Commercial Source |
|---|---|---|
| CERAFLOUR 961 | micronized modified polyethylene wax with a Mettler drop point of 140° C., density of 0.95 g/cc, and acid number of 0 | BYK Chemie USA, Inc. (Wallingford, CT) |
| ACUMIST 1528 | micronized amide modified polyethylene homopolymer wax with a Mettler drop point of 143° C., density of 0.97 g/cc, and acid number of 5 | Honeywell (Morristown NJ) |
| ADVALUBE E2100 | ester made from pentaerythritol-adipic acid-stearic acid components, used as external lubricant for PVC. | The Dow Chemical Co. |
| A-C 629A | oxidized low density polyethylene with Mettler drop point of 101° C., density of 0.93 g/cc, and acid number of 15 | Honeywell |
| A-C 307A | oxidized high density polyethylene with Mettler drop point of 140° C., density of 0.98 g/cc, and acid number = 7 | Honeywell |
| A-C 540A | low density polyethylene copolymer with acrylic acid with Mettler drop point of 105° C., density of 0.93 g/cc, and acid number of 40 | Honeywell |
| A-C 573A | low density polyethylene copolymer with maleic anhydride with Mettler drop point of 106° C., density of 0.92 g/cc, and acid number of 5 | Honeywell |
| A-C 575A | low density polyethylene copolymer with maleic anhydride with Mettler drop point of 106° C., and acid number of 35 | Honeywell |
| ADVAWAX 280 | 1,2-bis octadecanamido ethane (amide wax) with Mettler drop point of 135-146° C., density = 0.97 g/cc, and acid number <10 | PMC Group |
| XL-165R paraffin wax | Mettler drop point of 74° C. | Amerilubes L.L.C. |
| ACUMIST C5 | micronized polyethylene wax with Mettler drop point of 121° C., density of 0.95 g/cc, and acid number of 0 | Honeywell |
| A-C 400A | 87% ethylene-13% vinyl acetate copolymer with Mettler drop point of 92° C., density of 0.92 g/cc, and acid number of 0 | Honeywell |
| A-C 617A | Polyethylene homopolymer. Mettler drop point = 101° C. Density = 0.91 g/cc. Acid number = 0 | Honeywell |

Mettler Drop Point was measured in accordance with ASTMD-3954. Acid number was measured in accordance with ASTMD-1386. Density was measured in accordance with ASTM D-1505.

We claim:

1. A polymer composition comprising:
    a base resin which comprises
    from 30 to 70 weight percent (meth)acrylic resin having a Tg from 60 to 150° C.;
    from 70 to 30 weight percent polyvinylchloride (PVC);
    from 0.5 to 4 weight percent of anti-melding additive based on the total base resin weight; and
    from 0.5 to 25 weight percent colorant based on total base resin weight;
        wherein said anti-melding additive is a low density polyethylene wax having an acid number of equal to or less than 5 mg KOH/g and that is a homopolymer, or copolymer with acrylic acid, methacrylic acid, ethyl acrylate, butyl acrylate, vinyl acetate, maleic anhydride, or a combination thereof; and
    wherein the (meth)acrylic resin comprises:
        one or more core/shell polymers which comprise
            a crosslinked core comprising between 0.1 and 4 PHM crosslinking monomer and/or graft-linking agent and a (meth)acrylate copolymer having a glass transition temperature of less than or equal to −20° C.; and
            one or more, optionally crosslinked, thermoplastic shells having a Tg of equal to or greater than 60° C. wherein the total amount of the one or more shells comprises 5 to 90 wt % of the total weight of the one or more core/shell polymers.

2. The polymer composition according to claim 1, wherein the (meth)acrylate copolymer of the crosslinked core is butyl acrylate.

3. The polymer composition according to claim 1, wherein the thermoplastic shells comprise one or more (meth)acrylate copolymers, one or more (meth)acrylate/styrenic copolymers, one or more styrenic copolymers, or any combination thereof.

4. The polymer composition according to claim 1, wherein the (meth)acrylic resin comprises 25 to 90% of a thermoplastic (meth)acrylic copolymer having a Tg from 60 to 150° C. blended with 75% to 10% of an impact modifier selected from the group consisting of (meth)acrylic impact modifiers.

5. A capstock composition comprising two or more polymer compositions according to claim 1.

6. A process for making a capstock having more than one color comprising:
    selecting two or more polymer compositions according to claim 1, wherein the base resins do not comprise the same amount and/or type of colorant;
    extruding the two or more polymer compositions into pellets;
    mixing the two or more polymer composition pellets and extruding them to form a streaked capstock.

7. A capstock produced according to the process of claim 6.

* * * * *